(12) United States Patent
Achor et al.

(10) Patent No.: US 7,411,326 B2
(45) Date of Patent: Aug. 12, 2008

(54) BLDC MOTOR AND PUMP ASSEMBLY WITH ENCAPSULATED CIRCUIT BOARD

(75) Inventors: Kyle Dean Achor, Monticello, IN (US); Daniel L. Mahoney, Granada Hills, CA (US)

(73) Assignee: Federal Mogul World Wide, Inc., Southfield, MI (US)

( * ) Notice: Subject to any disclaimer, the term of this patent is extended or adjusted under 35 U.S.C. 154(b) by 265 days.

(21) Appl. No.: 11/435,958

(22) Filed: May 17, 2006

(65) Prior Publication Data
US 2006/0279162 A1 Dec. 14, 2006

Related U.S. Application Data

(60) Provisional application No. 60/681,795, filed on May 17, 2005.

(51) Int. Cl.
*H02K 11/00* (2006.01)
(52) U.S. Cl. ............................ 310/68 B; 310/71; 310/52
(58) Field of Classification Search ................ 310/68 B, 310/71, 43, 52, 54, 87–89; 417/366, 367, 417/423.7
See application file for complete search history.

(56) References Cited

U.S. PATENT DOCUMENTS

| | | | |
|---|---|---|---|
| 3,600,601 A | | 8/1971 | Ayres |
| 4,143,488 A | | 3/1979 | Ade et al. |
| 4,307,617 A | | 12/1981 | Greer et al. |
| 4,643,653 A | | 2/1987 | Masaka et al. |
| 4,644,202 A | | 2/1987 | Kroy et al. |
| 4,726,746 A | * | 2/1988 | Takada et al. ............ 417/423.1 |
| 4,728,833 A | | 3/1988 | Shiraki et al. |
| 4,773,829 A | * | 9/1988 | Vettori ........................ 417/366 |
| 4,830,576 A | | 5/1989 | Patrick |
| 4,978,282 A | | 12/1990 | Fu et al. |
| 4,998,865 A | * | 3/1991 | Nakanishi et al. ........ 417/423.7 |

(Continued)

FOREIGN PATENT DOCUMENTS

DE 3822897 1/1990

(Continued)

*Primary Examiner*—Thanh Lam
(74) *Attorney, Agent, or Firm*—Robert L Stearns; Dickinson Wright PLLC (57) ABSTRACT

A BLDC motor assembly and method for manufacturing same is disclosed. The motor has a housing, a shaft supported for rotation within the housing, a stator disposed within the housing for generating an electro-magnetic field, a rotor operatively coupled to the shaft and disposed for powered rotation within the stator in response to the electro-magnetic field, at least one temperature sensitive electronic device (TSED) disposed within the housing and electrically connected to the stator for controlling or measuring an aspect of the electro-magnetic field, and a fuel resistant and electrically insulated polymeric material encapsulating the TSED so that the TSED is protected from adverse temperature and chemical agents without the need for a separate internal container or a pre-potting operating. The TSED, which may be carried on a printed circuit board within the housing, is thus overmolded with polymeric material so that the polymeric material fills, or substantially fills, a space within the housing. Not only is the cost and weight associated with a prior art dedicated container for the electronics eliminated, but this invention allows greater design freedom in the location or placement of the various electrical devices within the housing for better motor efficiency and/or protection.

11 Claims, 8 Drawing Sheets

U.S. PATENT DOCUMENTS

| | | | |
|---|---|---|---|
| 5,007,806 A | 4/1991 | Bellis et al. | |
| 5,015,159 A | 5/1991 | Mine et al. | |
| 5,072,145 A | 12/1991 | Davis et al. | |
| 5,092,748 A | 3/1992 | Simmons, II | |
| 5,120,201 A | 6/1992 | Tuckey et al. | |
| 5,148,792 A | 9/1992 | Tuckey | |
| 5,231,967 A | 8/1993 | Baltz et al. | |
| 5,278,468 A | 1/1994 | Escaravage et al. | |
| 5,338,163 A | 8/1994 | Frank et al. | |
| 5,345,124 A | 9/1994 | Lang | |
| 5,368,805 A | 11/1994 | Motai | |
| 5,399,075 A * | 3/1995 | Frank et al. | 417/423.1 |
| 5,420,752 A | 5/1995 | Variot | |
| 5,421,706 A | 6/1995 | Martin, Sr. | |
| 5,454,697 A | 10/1995 | Nakanishi | |
| 5,462,622 A | 10/1995 | Small | |
| 5,570,272 A | 10/1996 | Variot | |
| 5,593,287 A | 1/1997 | Sadakata et al. | |
| 5,613,844 A | 3/1997 | Tuckey | |
| 5,695,471 A | 12/1997 | Wampler | |
| 5,697,769 A | 12/1997 | Kobman et al. | |
| 5,782,223 A | 7/1998 | Yamashita et al. | |
| 5,785,013 A | 7/1998 | Sinn et al. | |
| 5,810,568 A * | 9/1998 | Whitefield et al. | 417/423.8 |
| 5,908,286 A | 6/1999 | Clemmons | |
| 5,945,766 A | 8/1999 | Kim et al. | |
| 5,960,775 A | 10/1999 | Tuckey | |
| 5,961,293 A * | 10/1999 | Clemmons et al. | 417/44.2 |
| 5,997,262 A | 12/1999 | Finkbeiner et al. | |
| 6,025,665 A * | 2/2000 | Poag et al. | 310/89 |
| 6,063,321 A | 5/2000 | Koyama et al. | |
| 6,099,325 A | 8/2000 | Parkhill | |
| 6,102,011 A | 8/2000 | Meyer et al. | |
| 6,106,240 A | 8/2000 | Fischer et al. | |
| 6,129,524 A | 10/2000 | Woollenweber | |
| 6,132,184 A | 10/2000 | Robertson et al. | |
| 6,135,730 A | 10/2000 | Yoshioka | |
| 6,231,318 B1 * | 5/2001 | Cotton et al. | 417/423.1 |
| 6,296,458 B1 | 10/2001 | Zacher et al. | |
| 6,300,169 B1 | 10/2001 | Weiblen et al. | |
| 6,652,249 B2 * | 11/2003 | Kenney et al. | 417/410.3 |
| 6,659,737 B2 | 12/2003 | Bader et al. | |
| 6,722,794 B2 | 4/2004 | Mesaki | |
| 6,735,858 B1 | 5/2004 | Schmidt | |
| 6,821,110 B2 | 11/2004 | Carlson et al. | |
| 6,918,380 B2 | 7/2005 | Nomura | |
| 6,986,648 B2 | 1/2006 | Williams | |
| 7,057,318 B2 | 6/2006 | Strobl et al. | |
| 7,097,433 B2 | 8/2006 | Struthers et al. | |
| 2001/0033111 A1 | 10/2001 | Choi | |
| 2003/0173924 A1 | 9/2003 | Blase et al. | |
| 2003/0173925 A1 | 9/2003 | Blase et al. | |
| 2004/0028539 A1 | 2/2004 | Williams et al. | |
| 2004/0081566 A1 | 4/2004 | Bader et al. | |
| 2005/0000726 A1 | 1/2005 | Kimata et al. | |
| 2005/0001767 A1 | 1/2005 | Wulff et al. | |
| 2005/0076992 A1 | 4/2005 | Metcalf et al. | |
| 2005/0212367 A1 | 9/2005 | Blase et al. | |
| 2005/0214135 A1 | 9/2005 | Shibuya et al. | |
| 2007/0107475 A1 | 5/2007 | Hill | |

FOREIGN PATENT DOCUMENTS

| | | |
|---|---|---|
| DE | 4440238 | 5/1995 |
| EP | 1580434 | 9/2005 |
| GB | 2360302 A | 9/2001 |
| JP | 56064188 | 6/1981 |
| JP | 63176686 | 7/1988 |
| JP | 63189690 | 8/1988 |
| JP | 5079491 | 3/1993 |
| JP | 139447 | 5/1995 |
| JP | 2003180067 | 6/2003 |
| JP | 2004254384 | 9/2004 |
| JP | 2004353536 | 12/2004 |
| JP | 2004353537 | 12/2004 |
| JP | 2005188296 | 7/2005 |
| JP | 2006037878 | 2/2006 |
| WO | 9934847 | 7/1999 |
| WO | 2007053041 A1 | 5/2007 |

* cited by examiner

BLDC MOTOR AND PUMP ASSEMBLY WITH ENCAPSULATED CIRCUIT BOARD

CROSS-REFERENCE TO RELATED APPLICATION

The present application claims priority to U.S. provisional application entitled BLDC Motor and Pump Assembly with Encapsulated Circuit Board having Ser. No. 60/681,795 and filed on May 17, 2005.

BACKGROUND OF THE INVENTION

1. Field of the Invention

The invention relates generally to a brushless direct current motor, and more particularly to a motor coupled to a fluid pump having electronic components and circuitry encapsulated in a polymeric material.

2. Related Art

With the introduction of electronic control systems for electric motors, the industry objectives of long life, efficiency, reliability and low EM interference have become achievable. This is in part due to the advent of brushless direct current (BLDC) motor technology. Not only are the problems once associated with the prior art permanent magnet direct current motors overcome, but advances in MOS-FET devices have led to further performance advantages. While prior art BLDC motor designs have achieved their intended purpose, problems still exist. For example, the addition of control circuitry within the motor has increased design and manufacturing complexity of the motor. More specifically, the control circuitry must be appropriately packaged to protect it from the fluid in which the motor is submerged. If the fluid contacts the control circuitry corrosion and malfunctioning of the circuit will occur. The control circuitry includes temperature sensitive components that may be damaged by excessive heat applied during either the manufacturing of the motor or operation of same. Furthermore, the control circuitry is susceptible to radiated emissions from surrounding electrical devices.

Therefore, a need exists to further reduce manufacturing costs of BLDC motors, as well as to protect the control circuitry from the surrounding fluid and radiated emissions. Further, the motor should be configured to protect temperature sensitive electronic devices from malfunction or damage due to overheating, both during the manufacturing process and during subsequent operation of the motor.

SUMMARY OF THE INVENTION AND ADVANTAGES

The subject invention provides further advances in the BLDC motor and pump assembly technology. According to one aspect of the invention, a BLDC motor assembly comprises a housing, a shaft supported for rotation within the housing, a stator disposed at least partially within the housing for generating an electro-magnetic field, a rotor operatively coupled to the shaft and disposed for powered rotation within the stator in response to the electro-magnetic field, at least one temperature sensitive electronic device (TSED) disposed within the housing and electrically connected to windings of the stator for controlling or measuring an aspect of the electro-magnetic field, and a fuel resistant and electrically insulated polymeric material introduced into the housing and in contact therewith while encapsulating the TSED so that the TSED is protected from adverse temperature and chemical agents without the need for a separate internal container or a pre-potting operating. The TSED, which may be carried on a printed circuit board within the housing, is thus overmolded with polymeric material so that the polymeric material fills, or substantially fills, a space within the housing. Not only is the cost and weight associated with a prior art dedicated container for the electronics eliminated, but this invention allows greater design freedom in the location or placement of the various electrical devices within the housing for better motor efficiency and/or protection. For example, a BLDC motor may typically include a Hall-effect sensor to monitor the position of the rotor. According to the invention, which obviates the need for a separate internal container for the electronics, the Hall-effect sensors can be optimally positioned to provide better responsiveness and in some cases even to eliminate the need for additional electromagnets mounted on the rotor.

According to another aspect of the invention, a BLDC motor assembly comprises a housing, a shaft supported for rotation within the housing, a stator disposed at least partially within the housing for generating an electro-magnetic field, a rotor operatively coupled to the shaft and disposed for powered rotation within the stator in response to the electro-magnetic field, at least one TSED disposed within the housing and electrically connected to windings of the stator for controlling an aspect of the electro-magnetic field, the TSED having a critical temperature above which device malfunction is possible, a fuel-resistant and electrically insulating polymeric material disposed in the housing and in contact therewith while encapsulating and in direct contact with the TSED, the polymeric material being introduced into the housing in a generally fluidic form at a temperature above the critical temperature of the TSED, and a production heat sink feature located proximate the TSED to rapidly draw heat away from the TSED as the polymeric material is introduced into the housing. The production heat sink feature can be either a permanent part of the motor and pump assembly which is capable of rapidly drawing heat away from the TSED, for example the housing, or the production heat sink feature can be a removable molding core or sacrificial heat absorbing element like polystyrene. In the case of a removable molding core, further enhanced cooling characteristics can be achieved if the molding core is chilled. Thus, the TSED is protected against damage during the encapsulation process by the strategic and intentional use of a production heat sink feature.

According to yet another aspect of the invention, a BLDC motor assembly comprises a housing, a shaft supported for rotation within the housing, a stator disposed at least partially within the housing for generating an electro-magnetic field, a rotor operatively coupled to the shaft and disposed for powered rotation within the stator in response to the electromagnetic field, at least one TSED disposed within the housing and electrically connected to windings of the stator for controlling an aspect of the electro-magnetic field, the TSED having a critical temperature above which device malfunction is possible; a fuel-resistant and electrically insulating polymeric material disposed in the housing and in contact therewith while encapsulating and in direct contact with the TSED, and a fluid flow passage extending through the housing and routing adjacent the TSED for convectively removing heat from the encapsulated TSED by the movement of fluid at a temperature below the critical temperature to prevent device malfunction. This aspect of the invention, which can be conveniently realized when incorporated with a fluid pumping device, such as a fuel pump, takes advantage of the natural convective effects of a moving stream of cool liquid to pull heat away from the TSED during operation, thereby helping to maintain its operating temperature below the critical temperature.

BRIEF DESCRIPTION OF THE DRAWINGS

These and other features and advantages of the present invention will become more readily appreciated as the same becomes better understood by reference to the following detailed description when considered in connection with the accompanying drawings, wherein.

DETAILED DESCRIPTION OF THE PREFERRED EMBODIMENT

Referring to the Figures, wherein like numerals indicate like or corresponding parts throughout the several views, a brushless direct current (BLDC) motor assembly according to an embodiment of the present invention is generally shown at 10.

Figure 1:
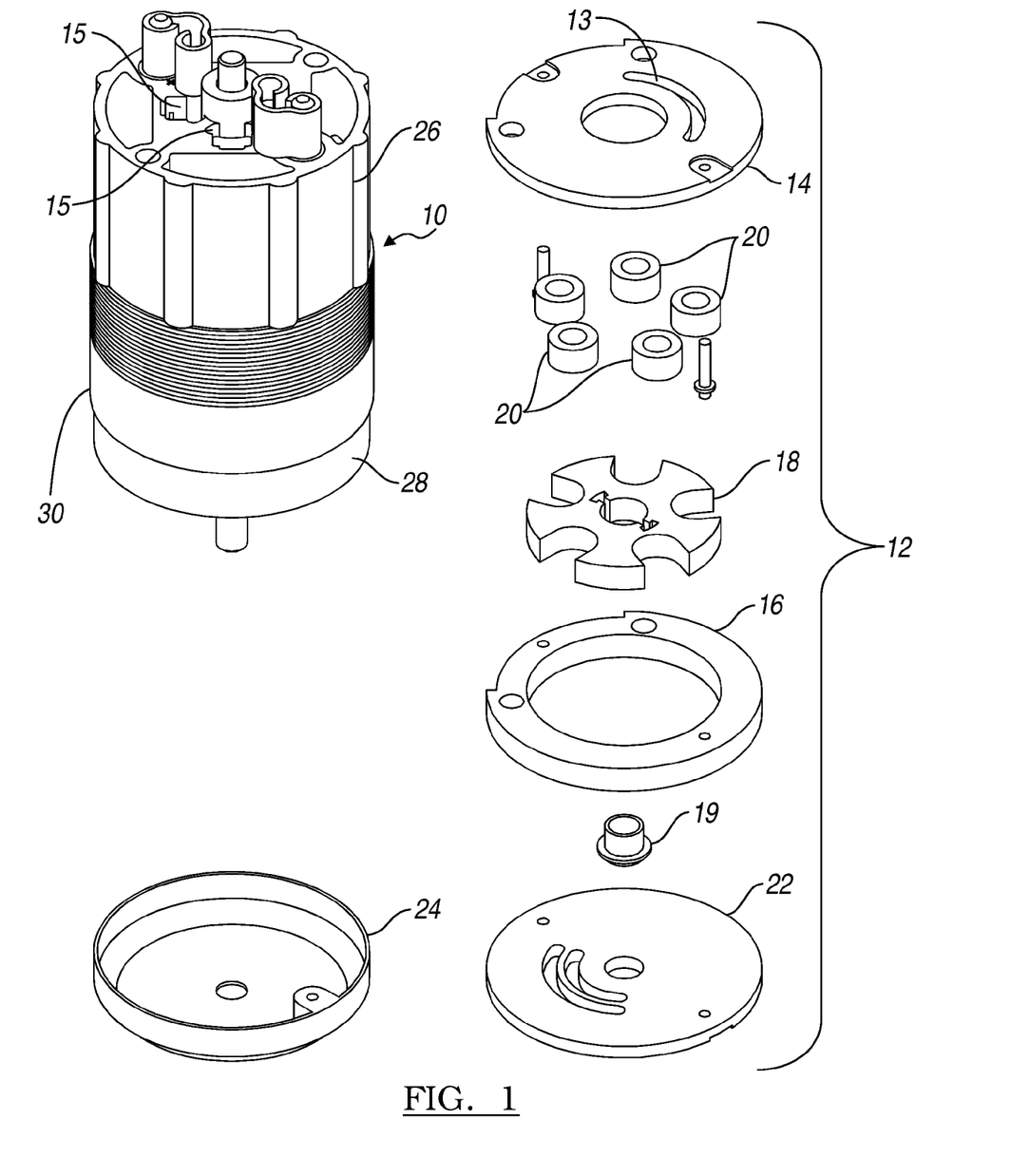
FIG. 1 is a partially exploded view showing a BLDC motor and an exemplary vane style pumping element.

In FIG. 1, the motor assembly 10 is illustrated in the application of a fuel pump. A fluid pump, generally shown at 12, is coupled to the lower end of the motor assembly 10. However, any other driven component or feature can of course be coupled to the motor assembly 10 instead of a fuel pump. The fluid pump 12 is shown here of the vane style, however, other pump types, such as other positive displacement styles, impeller styles, and the like, may be used with equal effect.

In FIG. 1, the fluid pump 12 is shown including an outlet port plate 14 which adjoins to the lower end of the motor assembly 10. A cam ring 16 is held against the outlet port plate 14 and surrounds a rotor 18 and an away of captured rollers 20. The rotor 18 is forcibly rotated by the motor assembly 10 and thus drives the rollers 20 in an orbit around the inner circumference of the cam ring 16. Movement of the rollers 20 relative to pockets in the rotor 18 and cam ring 16 displaces a fluid, such as in this example fuel for an internal combustion engine. An inlet port plate 22 encloses the pumping chamber and a filter 24 screens the fluid as it is drawn in through an inlet port in the inlet port plate 22. Thus, fluid drawn in through the filter 24 and inlet port plate 22 are forcibly discharged through an opening 13 in the outlet port plate 14 which directs the pumped media into the motor assembly 10 where it acts as a cooling medium before it is discharged through an outlet 15 in the upper portion of the motor assembly 10.

Figure 2:
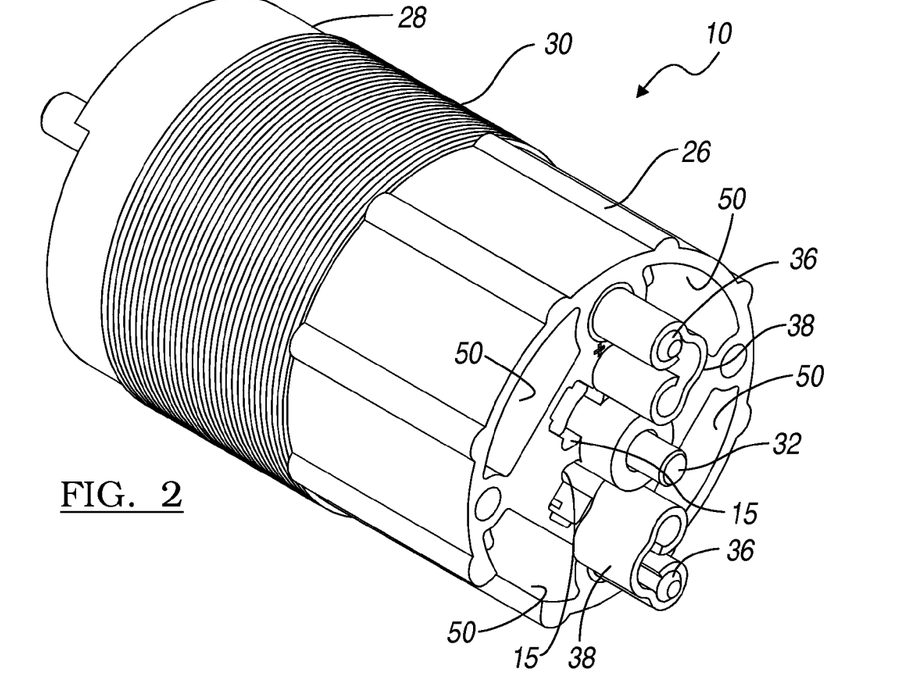
FIG. 2 is a perspective view of the BLDC motor assembly highlighting the upper housing portion.
Figure 3:
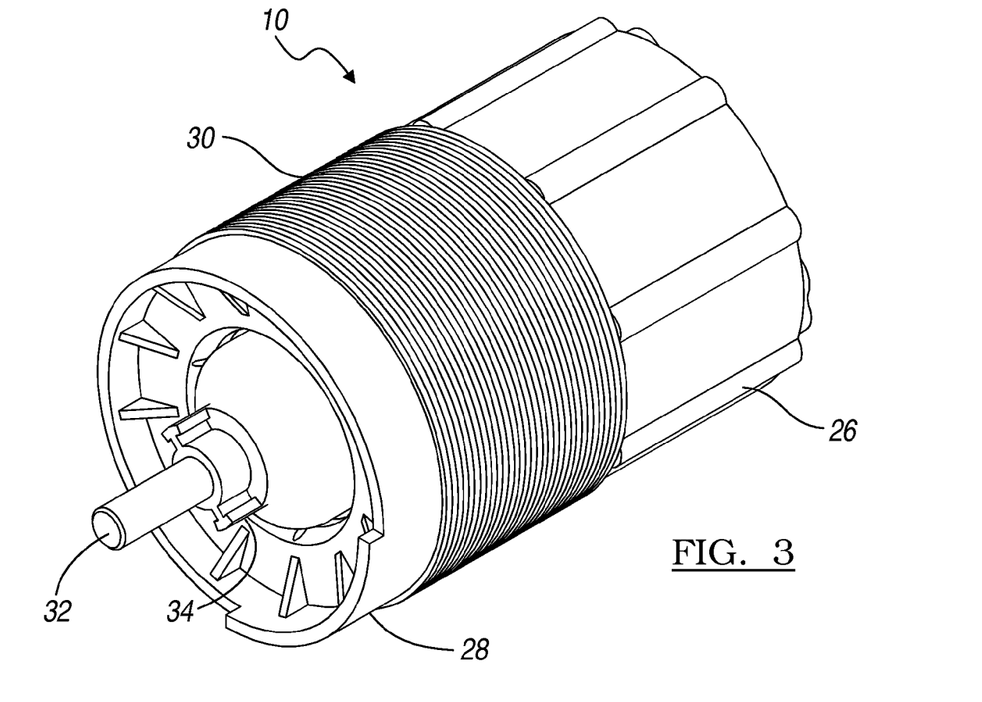
FIG. 3 is a perspective view of the BLDC motor assembly highlighting the lower housing portion.
Figure 9:
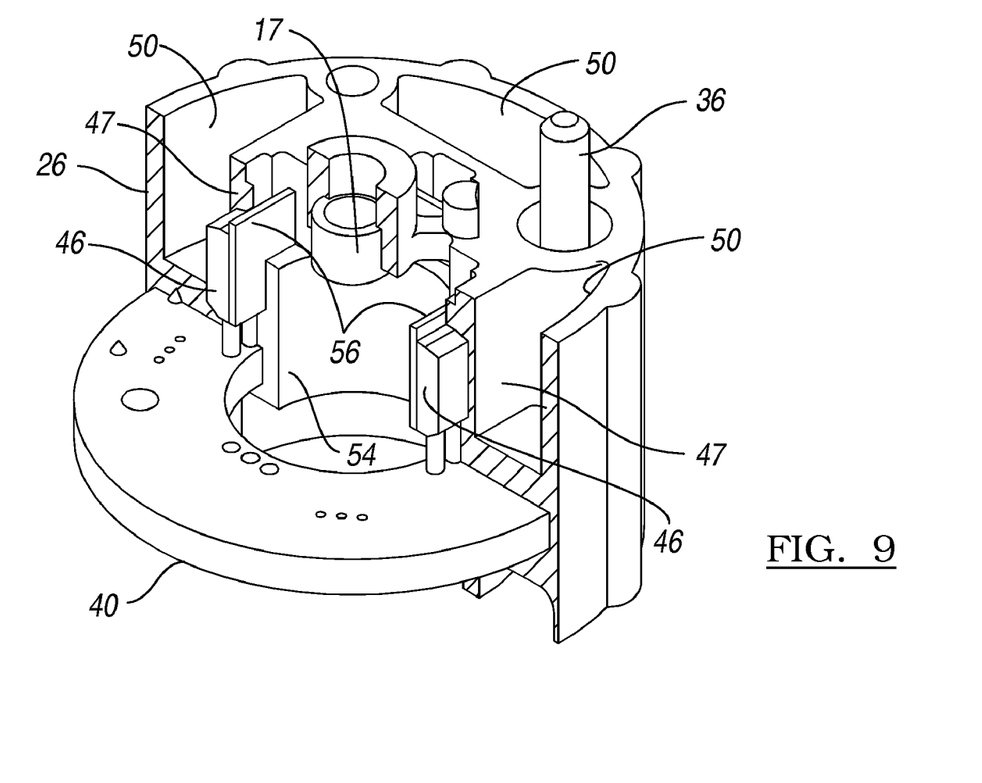
FIG. 9 is a partially sectioned perspective view of the upper housing after encapsulation of the motor control circuit.
Figure 10:
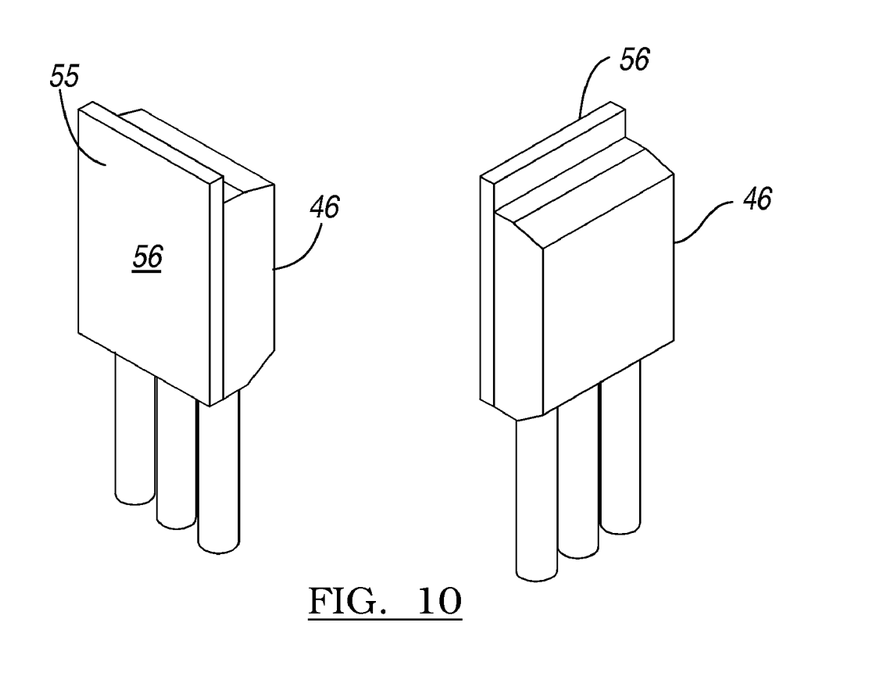
FIG. 10 is a view showing a MOS-FET device from two perspectives.

FIGS. 2 and 3 show various perspective views of the motor assembly 10 and illustrate in particular the housing feature which is composed, preferably, of an upper housing portion 26 and a lower housing portion 28. Stack laminations comprising part of a stator 30 are captured between the upper 26 and lower 28 housing portions. A shaft 32 is supported for rotation within the housing with an end portion thereof extending from the lower housing portion 28 in FIG. 3. This extending portion of the shaft 32 is coupled to the pump rotor 18 through an appropriate coupling device 34. The opposite end of the shaft 32 is shown protruding from the upper housing portion 26 in FIG. 2. Bearings support the shaft 32. One such bearing 17 is shown in the upper 26 housing portion in FIG. 9. The other bearing 19 may be located either in the lower housing portion 28 or in the pump assembly 12, such as between the cam ring 16 and the inlet port plate 22. Also protruding from the upper housing portion 26 are shown electrical terminals 36 for energizing the motor assembly 10 and transmitting the necessary control and feedback signals. If the terminals 36 do not align with mating connections, jumper straps 38 may be employed.

Figure 4A:
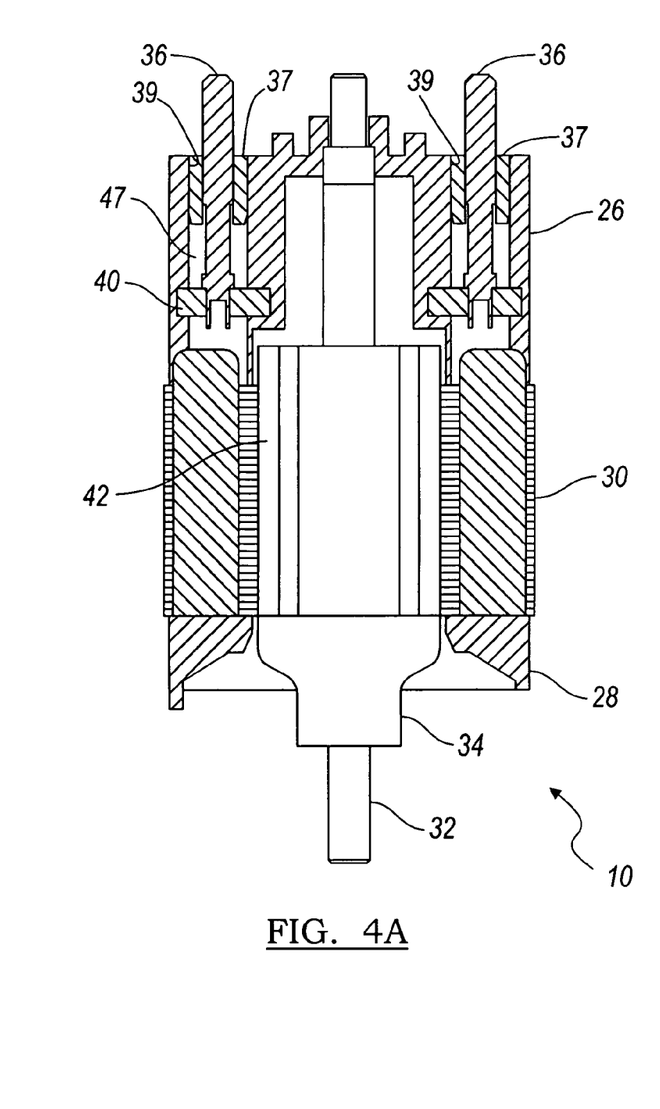
FIGS. 4A and 4B illustrate a vertical cross-section through the BLDC motor assembly taken in a plane intersecting the motor terminals.
Figure 4B:
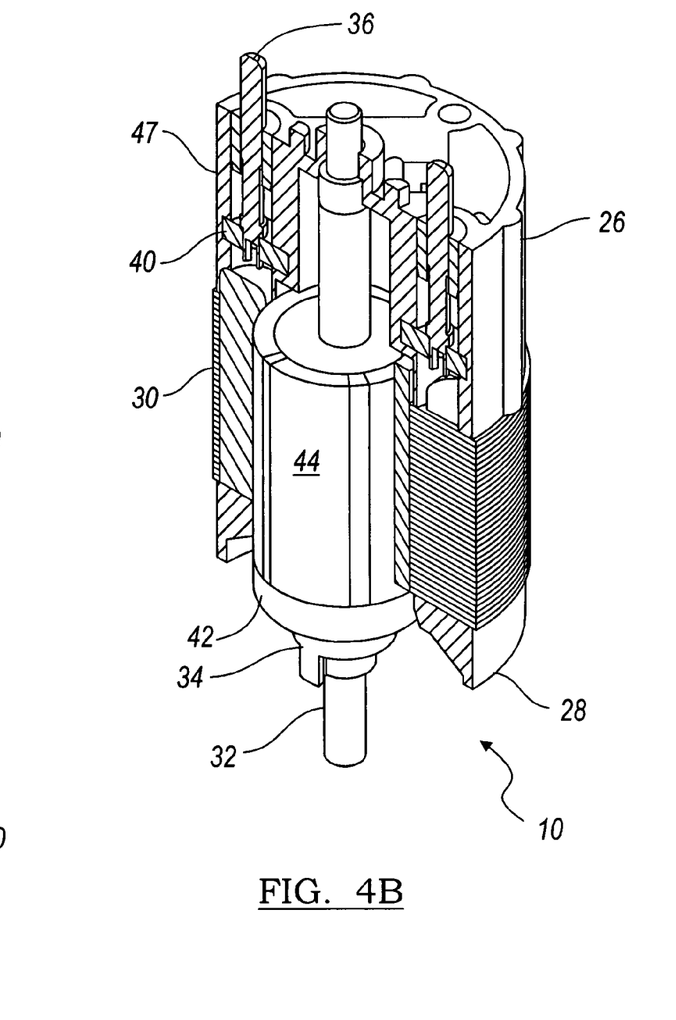

The stator 30 is better shown in FIGS. 4A and 4B as it is trapped between the upper 26 and lower 28 housing portions. The stator 30 includes the customary plate laminations and windings, and may be further powder coated for electrical insulation protection from the wires of the windings. The terminals 36 are electrically connected to the stator 30. The terminals 36 are also mounted in, and electrically connected to, a circuit board 40. When energized, the stator 30 creates an electro-magnetic field in the manner typical of direct current motors.

A rotor 42 is operatively coupled to the shaft 32 and disposed for powered rotation within the stator 30 in response to the electro-magnetic field generated by the stator 30. The rotor 42 may be fabricated according to any of the known techniques, including a core which is subsequently over-molded or otherwise affixed with magnetic segments 44. In the embodiment shown, four such magnet segments 44 are arrayed in equal arcuate increments about the exterior of the rotor 42. These magnet segments 44 may be of the so-called neo-magnet type and can be charged either before or after bonding to the underlying rotor core 42.

With continuing reference to FIGS. 4a and 4b, terminal seals 37 are shown in cross-section. Terminal seals 37 are disposed in an annular opening 39 in upper housing 26. The terminal seals 37 are annular in shape and are made of a polymeric material. For example, seals 37 may be made of a material known as Hytrel, manufactured by Dupont of Delaware and sold under the product number 7246, or any comparable material. Further, seals 37 have an outside diameter dimensioned to have an interference fit with the inside diameter of annular opening 39 and an inside diameter dimensioned to have interference fit with the outside diameter of terminals 36. As such, seals 37 prevent infiltration of fluid into opening 39 further enhancing the durability and reliability of motor assembly 10.

Figure 5A:
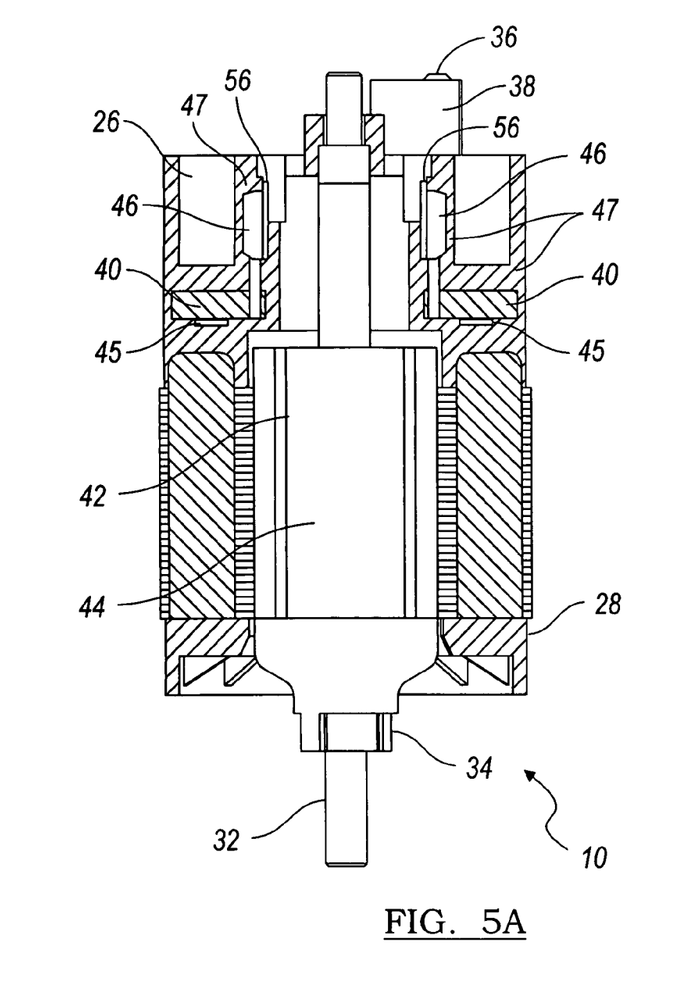
FIGS. 5A and 5B illustrate vertical cross-sections of the BLDC motor assembly taken in a plane off-set from that used in FIGS. 4A and 4B.
Figure 5B:
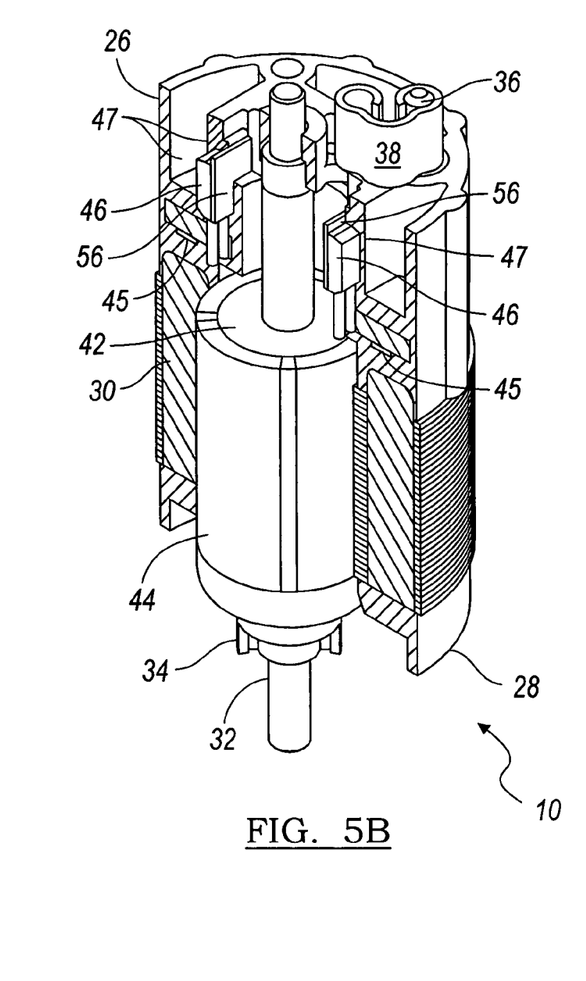
Figure 6:
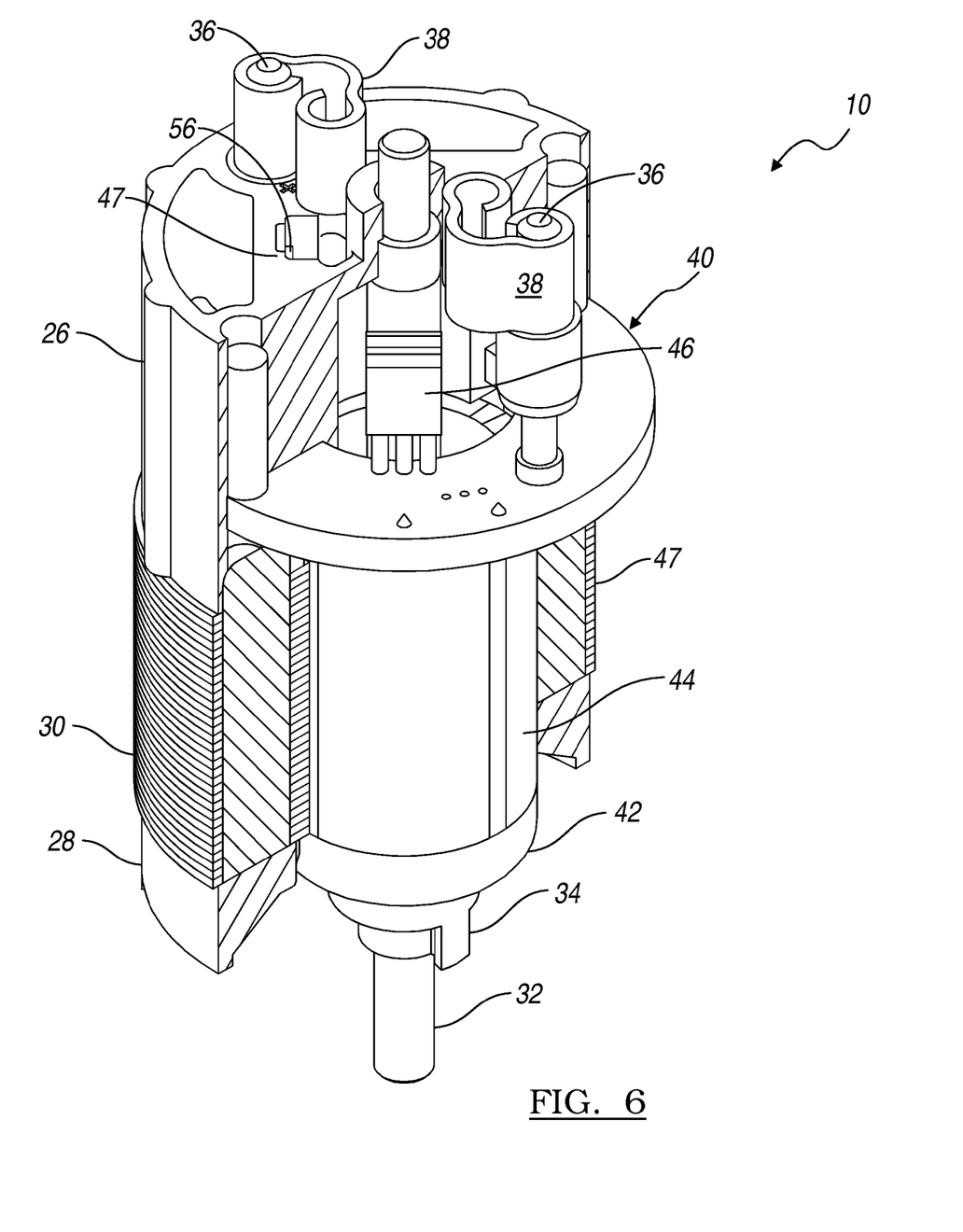
FIG. 6 is a partially sectioned view showing the BLDC motor assembly according to the subject invention.

Referring now to FIGS. 5A, 5B and 6, the circuit board 40 is shown supporting a plurality of electrical circuits, components and devices. Typically, these electronic devices will include one or more Hall-effect sensors responsive to the magnet segments 44 (or secondary magnets), and one or more MOS-FETS 46 associated with each of the Hall-effect sensors. Further, circuit board 40 includes a plurality of capacitors 45 for suppressing conducted emissions. Capacitors 45 are operatively connected to circuit board 40 and associated circuitry to filter out any conducted emissions. Advantageously, the inclusion of capacitors 45 on circuit board 40 eliminates the need for external filtration devices in the fluid pump wiring and/or connectors. The Hall-effect sensors (not shown in the drawings) are preferably located on the underside of the circuit board 40, whereas the MOS-FETS 46 extend upwardly from the circuit board 40. The MOS-FETS 46 may be temperature sensitive electronic devices (TSED) having a critical device junction temperature of approximately 150° C. If at any time the MOS-FETS 46 are subjected to temperatures in excess of the critical temperature, device damage and subsequent malfunction is possible. Therefore, it is important to protect not only the circuit board 40 and all of its electronics, but also to guard against overheating of the MOS-FETS 46 (or other TSED) during the fabrication process and during normal operation of the motor assembly 10.

During the fabrication process, the circuit board 40 with all its pre-joined components, including the Hall-effect sensors and the MOS-FETS 46, are deposited into a mold cavity, which is then filled with a fuel-resistant and electrically insulating polymeric material 47, such as a resin. Preferably, this polymeric material 47 is injection molded under pressure and in a fluidic condition, to forcibly drive the polymeric material 47 into all interstitial spaces of the mold cavity and minimize the potential for air inclusions. Thus, the fuel-resistant and electrically insulating polymeric material 47 fully encapsulates and is in direct contact with the electrical components and the circuit board 40. In this manner, the full complement of electronics are protected from adverse temperature swings, abrasions, vibrations, and chemical agents without the need for a separate internal container or a pre-potting operation as taught by the prior art. Furthermore, this in situ overmolding process allows greater design freedom to locate the various electrical components, including the Hall-effect sensors, in more strategic locations to improve performance and heat transfer, and to other advantage. For example, the prior art BLDC motor assemblies which enclosed the electrical components in a dedicated container within the housing may require additional magnets, i.e., in addition to the magnet segments 44 on the rotor 42, to properly influence the Hall-effect sensors. Further, excess weight and unnecessary preassembly operations are avoided. As shown in FIGS. 1, 2, 4A, 4B, 5A, 5B, and 6-9, after final assembly, the polymeric body 47 encircles both a portion of the rotor 42 axially spaced from said plurality of magnets 44 and a portion of the stator 30. Also, as shown in FIGS. 1, 2, 4A, 4B, 5A, 5B, and 6-9, the bearing 17 that supports a second end of the rotor 42 is supported by the polymeric body 47.

Figure 11:
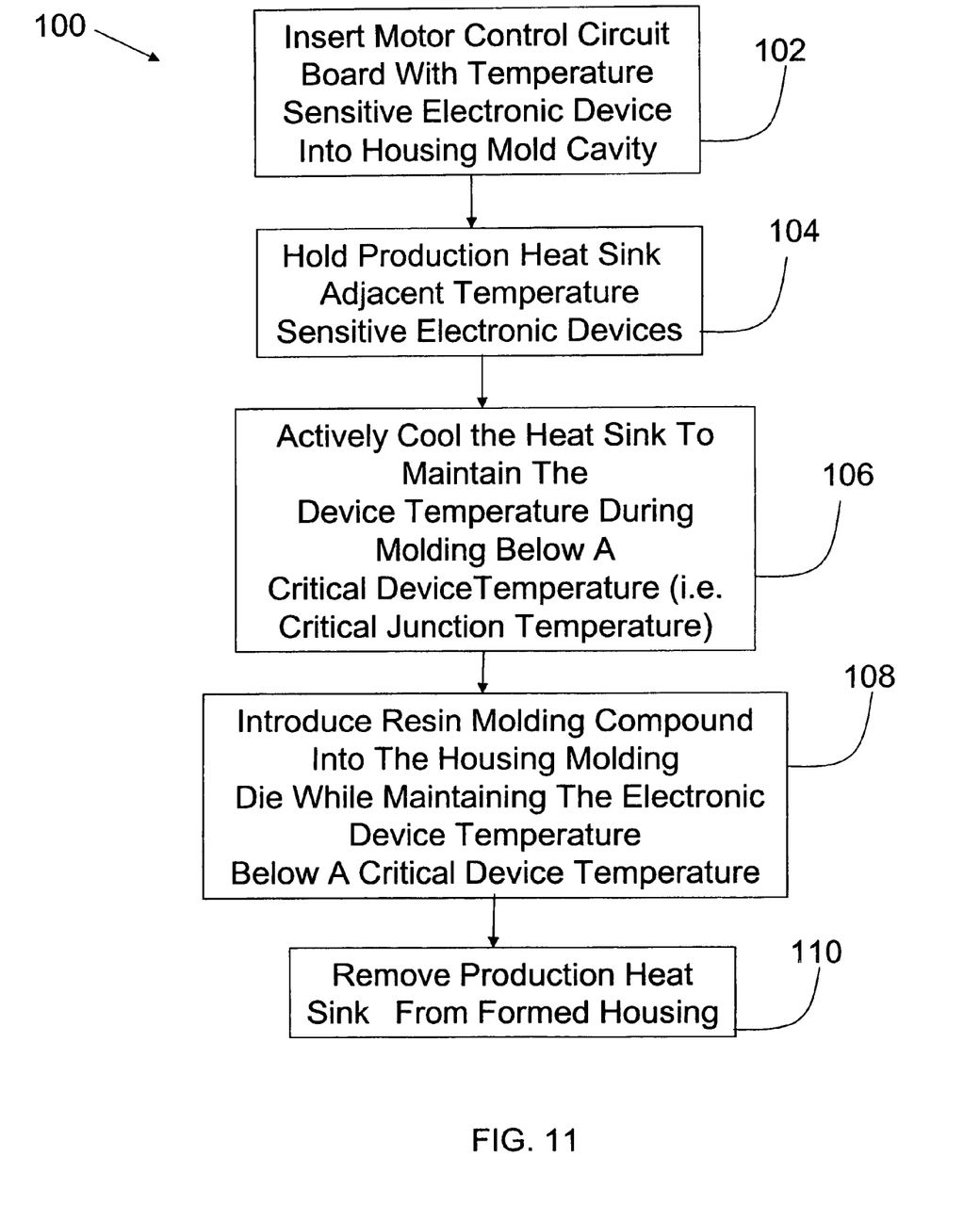
FIG. 11 is a flowchart illustrating a method for manufacturing the fluid pump, in accordance with an embodiment of the present invention.

A method 100 for forming upper housing 26 and overmolding circuit board 40 is illustrated in FIG. 11, in accordance with an embodiment of the present invention. In an initial step, circuit board 40 is placed in an empty mold cavity, as represented by block 102. A fixture holds the circuit board 40 in a predetermined location within the mold. For example, the fixture clamps onto the terminals that are attached to circuit board 40. In order to protect the TSEDs attached to the circuit board from exposure to excessive heat of the overmolding process production heat sinks, as described below, are held in place adjacent the TSEDs, as represented by block 104. The production heat sinks may be actively cooled by passing a fluid over the heat sink, as represented by block 106. At block 108, a polymeric material is injected into the mold to form upper housing 26 and encapsulate circuit board 40 in the polymeric material 47. The production heat sinks are then removed from the upper housing 26, as represented by block 110. The removal of the production heat sinks, in an embodiment of the present invention, form cavities 50 and passageways 54 shown in FIG. 8. Upper housing 26 with encapsulated circuit board 40 may also be formed directly on the stator 30 in a single operation. In an alternative method, the circuit board 40 with all its pre-joined components, including the Hall-effect sensors and the MOS-FETS 46, are deposited into an empty shell upper housing, which is then filled with the fuel-resistant and electrically insulating polymeric material 47, such as a resin.

Referring again to the temperature sensitivity issue inherent in some of the electrical components, such as for example with a MOS-FET 46, various strategies can be employed to protect these temperature sensitive electrical devices (TSED). This is particularly important when the fuel resistant electrically insulating polymeric material 47 is introduced into the mold cavity or an empty shell housing at a temperature above the critical temperature of the TSED. For example, if the overmolding process requires the polymeric material 47 to be heated above 150° C., which is an exemplary critical temperature for the MOS-FET 46, it is necessary to provide a production heat sink feature located proximate to the TSED that will rapidly draw heat away from the TSED as the hot polymeric material 47 is introduced into the housing 26. Thus, the production heat sink feature is used during the production, or fabrication, process to prevent overheating damage to the TSED.

Figure 7:
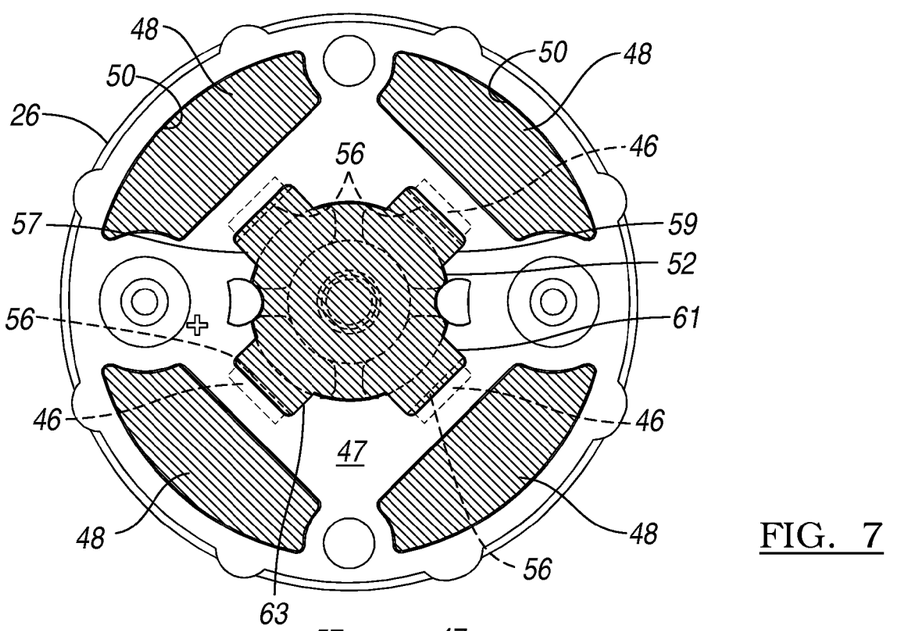
FIG. 7 is an end view of the motor control circuit board with exemplary production molding cores super-imposed.
Figure 8:
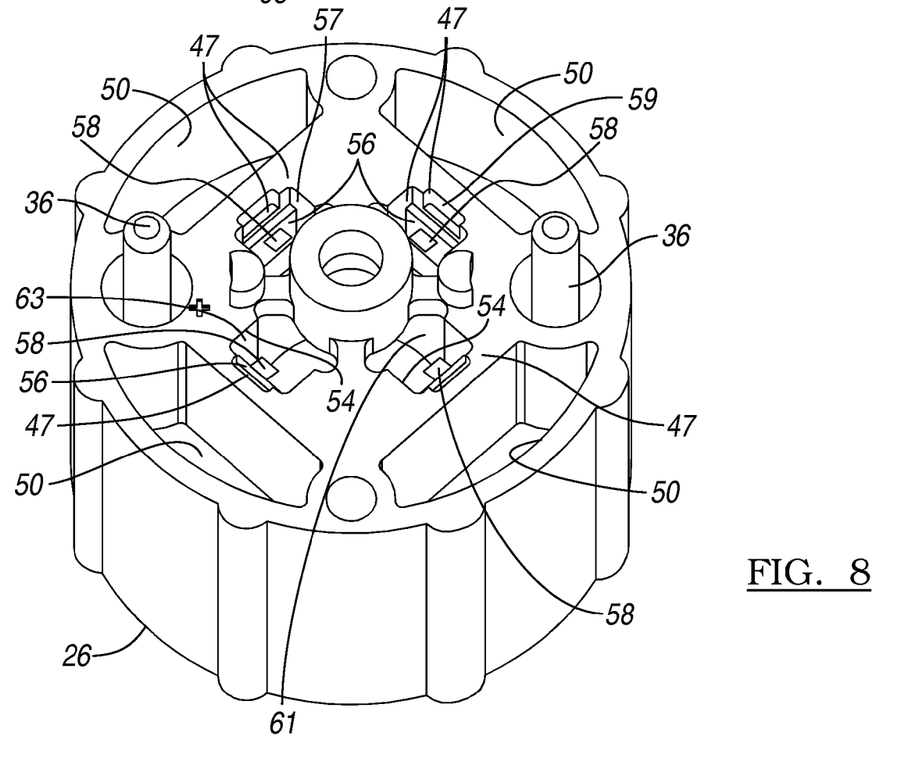
FIG. 8 is a perspective view of the upper housing after encapsulation of the motor control circuit.

The production heat sink feature can take many forms. For example, if the upper housing portion 26 is made from a material having rapid heat transfer qualities such as is common with many metals, the TSEDs could be located in physical contact with or nearly proximate to the housing so that heat is pulled away and the temperature of the polymeric material 47 quickly reduced to the point of solidification and below the critical temperature. Another alternative for the production heat sink feature can take the form of a removable molding core. FIG. 7 illustrates the possible location of several removable molding cores 48 disposed between the MOS-FETS 46 and the housing 26. When removed, the molding cores 48 result in cavities 50 as shown in FIG. 8 whose open quality will promote good heat transfer during subsequent operation. Alternatively, and referring again to FIG. 7, the removable molding core can be disposed radially inwardly from the MOS-FETS 46 such as represented by the removable core 52. After the overmolding process and removal of the core 52, fluid flow passages 54 remain as features in the upper housing portion 26. As shown in FIGS. 1, 2, 4A, 4W, 5A, 5W and 6-9, the passageway 54 is substantially axially centered with respect to said polymeric body 47. As shown in FIGS. 1, 2, 5A, 5B, and 6-9, the passageway 54 substantially encircles the bearing 17. As shown in FIGS. 1, 2, 7 and 8, at least a portion of the passageway 54 defines a multifid cross-section. As best shown in FIGS. 7 and 8, at the outlet 15, the cross-section of the passageway 54 defines lobes 57, 59, 61, 63. The lobes 57, 59, 61, 63 extend from a center axis of the passageway toward the sensors 46. The plurality of cavities 50 are radially aligned with lobes 57, 59, 61, 63 of the multifid cross-section. Thus, the surface area for heat transfer between the polymeric body 47 and the fuel passing through the motor assembly 10 is enhanced. The removable cores 48, 52 can be forcibly cooled, such as with circulating water or other chilling operation, to further enhance the heat removing characteristics of the production heat sink feature. Of course, other variations and methods of removing heat from the TSED during the overmolding operation are entirely possible and within the scope of this invention.

While the foregoing description has been concerned primarily with the protection of the TSED during the production process, it is also important to protect the TSED from overheating during subsequent use of the motor assembly 10. The subject invention advantageously addresses this problem by routing the fluid flow passage 54 through the housing 26 adjacent the TSED for convectively removing heat from the encapsulated TSED by the movement of fluid through the flow passage 54 at a temperature below the critical temperature of the TSED. Thus, by taking advantage of the movement of a fluid or gas through the flow passage 54 which is at a temperature lower than the critical temperature of the TSED, heat can be transferred by convection into the flowing fluid stream to help maintain a safe operating temperature for the TSED. As shown in the examples, wherein the MOS-FETS 46 have been, for purposes of discussion only, designated as the TSED components, they have been strategically located adjacent to the flow passage 54 to take advantage of the convective cooling phenomenon.

To further enhance these operational heat sinking characteristics, the TSED, i.e., the MOS-FET 46, is provided with a cooling plate 56 which is either manufactured as part of the FET or affixed in a pre-assembly operation. The cooling plate 56, which is perhaps best shown in FIG. 10, can be a metal or other heat conductive material adjoined to the MOS-FET 46 so as to draw heat away through conduction. One side of each cooling plate 56 is thus exposed to the fluid flowing through the passage 54 to enhance the cooling capabilities. Thus, as shown in FIGS. 5A, 5B, and 8-10, the cooling plate 56 physically contacts the sensor 46 and has a surface 55 open to the passageway 54. The cooling plates 56 may also be particularly advantageous during the overmolding operation, wherein the removable molding cores 48 are in touching contact or close proximity to the cooling plates 56 to help maintain the TSED below its critical temperature. Moreover, the cooling plates 56 may have a variety of configurations to enhance heat transfer. For example, cooling plates 56 may include one or more cooling fins 58 which extend from a surface of the cooling plate into and towards a center axis of the passage 54 to increase the surface area of the cooling plate to be cooled by the fluid flowing through passage 54.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A fuel pump assembly comprising:
   a fluid pump for pumping fuel;
   a rotor engaged with said fluid pump at a first end and having with a plurality of magnets;
   a stator with a plurality of windings encircling said plurality of magnets of rotor;
   a circuit board operable to control a current directed to said windings of said stator;
   at least one sensor disposed to sense a proximity of said plurality of magnets and communicate a signal to said circuit board in response to said sensed proximity and wherein said circuit board controls the current at least partially in response to said signal; and
   a polymeric body formed from fuel-resistant and electrically insulating material and encapsulating said circuit board and said at least one sensor and defining at least one passageway operable to directly receive a stream of fuel to cool said circuit board and said at least one sensor.

2. The fuel pump assembly of claim 1 wherein said at least one passageway is further defined as being substantially axially centered with respect to said polymeric body.

3. The fuel pump assembly of claim 1 wherein said polymeric body is further defined as encircling a portion of said rotor axially spaced from said plurality of magnets.

4. The fuel pump assembly of claim 3 further comprising:
   a bearing supporting a second end of said rotor opposite said first end and supported by said polymeric body.

5. The fuel pump assembly of claim 4 wherein said at least one passageway substantially encircles said bearing.

6. The fuel pump assembly of claim 1 further comprising:
   at least one cooling plate physically contacting said at least one sensor and having at least one surface open to said at least one passageway.

7. The fuel pump assembly of claim 6 wherein said at least one cooling plate further comprises:
   at least one cooling fin projecting from at least one surface towards a center axis of said at least one passageway.

8. The fuel pump assembly of claim 1 wherein said polymeric body is further defined as encircling a portion of said stator.

9. The fuel pump assembly of claim 1 wherein said polymeric body is further defined as encircling both a portion of said rotor and a portion said stator.

10. The fuel pump assembly of claim 1 wherein at least a portion of said at least one passageway defines a multifid cross-section.

11. The fuel pump assembly of claim 10 wherein said polymeric body includes a plurality of cavities radially aligned with lobes of said multifid cross-section.

* * * * *